United States Patent
Pansegrouw

(10) Patent No.: US 10,408,360 B2
(45) Date of Patent: *Sep. 10, 2019

(54) INFLATION VALVE

(71) Applicant: Stopak India Pvt. ltd., Bangalore (IN)

(72) Inventor: Bester Jacobus Pansegrouw, Ottery (ZA)

(73) Assignee: Stopak India Pvt. Ltd., Bangalore (IN)

(*) Notice: Subject to any disclaimer, the term of this patent is extended or adjusted under 35 U.S.C. 154(b) by 0 days.

This patent is subject to a terminal disclaimer.

(21) Appl. No.: 15/900,121

(22) Filed: Feb. 20, 2018

(65) Prior Publication Data

US 2018/0172169 A1    Jun. 21, 2018

Related U.S. Application Data

(63) Continuation of application No. 14/902,940, filed as application No. PCT/IB2014/060727 on Apr. 15, 2014, now Pat. No. 9,915,365.

(30) Foreign Application Priority Data

Jul. 5, 2013    (ZA) .................................. 2013/0545

(51) Int. Cl.
    *F16K 15/20*     (2006.01)
    *F01L 3/10*     (2006.01)

(52) U.S. Cl.
    CPC ............... *F16K 15/205* (2013.01); *F01L 3/10* (2013.01); *Y10T 137/3584* (2015.04); *Y10T 403/4651* (2015.01)

(58) Field of Classification Search
    CPC ........... Y10T 137/3584; Y10T 137/374; Y10T 137/3755; Y10T 403/4651;

(Continued)

(56) References Cited

U.S. PATENT DOCUMENTS 241,930 A    5/1881    Clayton
3,411,397 A    11/1968    Birmingham (Continued)

FOREIGN PATENT DOCUMENTS

EP    0 849 513 A2    6/1998
GB    2 038 452 A    7/1980

OTHER PUBLICATIONS

European Patent Office, Extended European Search Report dated Feb. 22, 2017 for corresponding European Application No. 14819730.4 (6 pages).

(Continued)

*Primary Examiner* — R. K. Arundale
(74) *Attorney, Agent, or Firm* — Neal, Gerber & Eisenberg LLP

(57) ABSTRACT

An inflation valve for inflating containers with non-rigid walls comprising a tubular body defining a passage with a first opening at one end and a second opening at its opposite end, adapted to be secured to a container, a sealing disc adapted to sealingly close off the second opening to the passage in the tubular body, and adapted to open the second opening mechanically when an inflation device is inserted into the passage through the first opening and thus gas may be passed into the container through the second opening, thereby moving the sealing disc away from the second opening, a guide member located within the passage of the tubular body; a spring adapted to assist the sealing disc to close off the second opening; and a gasket and/or sealing ring adapted to assist the sealing disc to close off the second opening.

20 Claims, 6 Drawing Sheets

(58) Field of Classification Search
CPC ......... Y10T 403/4654; Y10T 403/5657; Y10T 403/4661
USPC ...................................................... 251/337
See application file for complete search history.

(56) References Cited

U.S. PATENT DOCUMENTS

| | | | |
|---|---|---|---|
| 3,785,395 A | 1/1974 | Andreasson | |
| 3,808,981 A | 5/1974 | Shaw | |
| 4,015,622 A | 4/1977 | Pagani | |
| 4,046,163 A | 9/1977 | Novak | |
| 4,073,389 A | 2/1978 | Angarola et al. | |
| 4,146,070 A | 3/1979 | Angarola et al. | |
| 4,257,575 A | 3/1981 | Runyan | |
| 4,766,628 A | 8/1988 | Walker | |
| 4,927,397 A | 5/1990 | Yeager | |
| 5,082,244 A | 1/1992 | Krier et al. | |
| 5,111,838 A | 5/1992 | Langston | |
| 5,143,351 A | 9/1992 | Pierce | |
| 5,255,640 A | 10/1993 | Pierce | |
| 5,339,959 A | 8/1994 | Cornwell | |
| 5,540,528 A | 7/1996 | Schmidt et al. | |
| 5,806,572 A | 9/1998 | Voller | |
| 5,839,488 A | 11/1998 | Peters | |
| 6,089,251 A | 7/2000 | Pestel | |
| 6,375,158 B1* | 4/2002 | Kramer ................ | F01L 3/10 251/336 |
| 7,051,753 B1 | 5/2006 | Caires et al. | |
| 7,434,594 B1 | 10/2008 | Robbins et al. | |
| 9,314,108 B2* | 4/2016 | DeFranks .............. | A47C 27/04 |
| 2005/0087160 A1* | 4/2005 | Simpson ............... | F01L 1/0532 123/90.28 |
| 2006/0033067 A1 | 2/2006 | Wang | |
| 2008/0029166 A1 | 2/2008 | Song et al. | |
| 2009/0139582 A1 | 6/2009 | Franta et al. | |
| 2010/0043914 A1 | 2/2010 | Pansegrouw | |
| 2010/0154897 A1 | 6/2010 | Wu | |
| 2011/0140327 A1* | 6/2011 | Imaizumi ............... | F01L 1/462 267/174 |
| 2012/0048392 A1 | 3/2012 | Song et al. | |
| 2012/0060955 A1* | 3/2012 | Zhu ......................... | F01L 1/26 137/798 |
| 2012/0132841 A1* | 5/2012 | Aoki ...................... | F01L 1/462 251/337 |
| 2012/0285552 A1 | 11/2012 | Song et al. | |
| 2014/0209185 A1 | 7/2014 | Wang et al. | |
| 2015/0037113 A1 | 2/2015 | Maness et al. | |
| 2018/0094553 A1* | 4/2018 | Nair ........................ | F01L 1/26 |

OTHER PUBLICATIONS

International Search Report for PCT/IB2014/060727 dated Jul. 17, 2014 (5 pages).

* cited by examiner

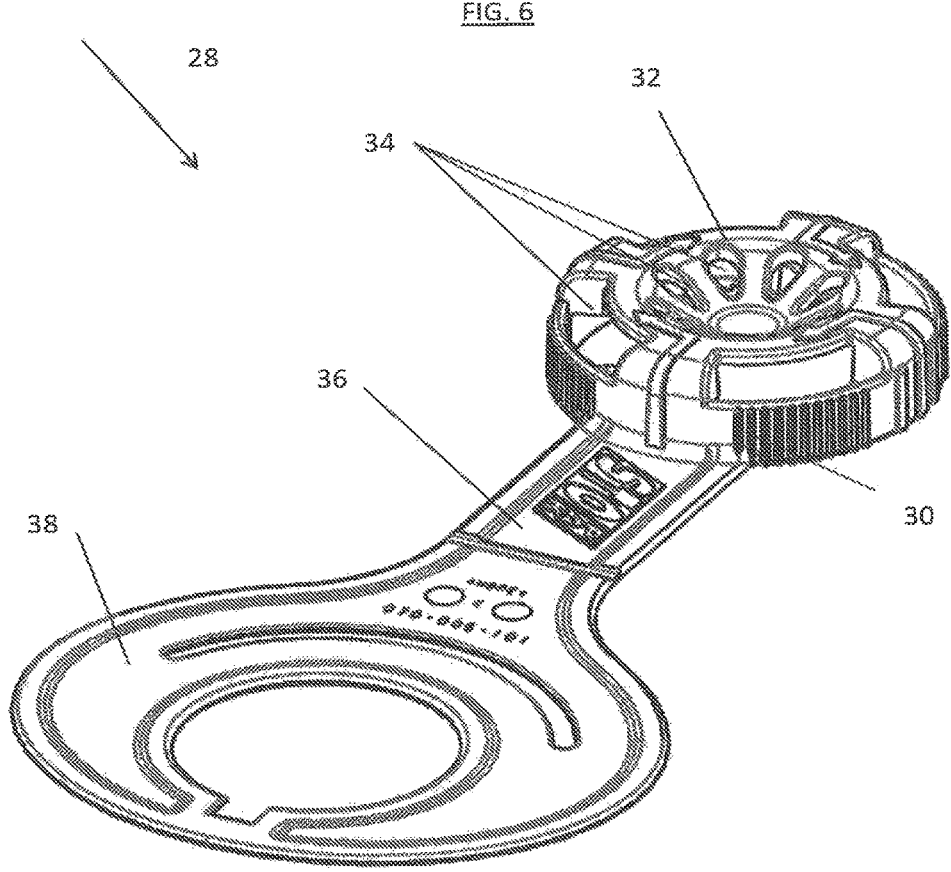

INFLATION VALVE

PRIORITY CLAIM

This application is a continuation of, claims priority to and the benefit of U.S. patent application Ser. No. 14/902,940, filed on Jan. 5, 2016 as a 371(c) Application of PCT/IB2014/060727, filed on Apr. 15, 2014, which claims priority to and the benefit of South Africa Patent Application No. 2013/05045, filed on Jul. 5, 2013, the entire contents of each are incorporated by reference herein.

FIELD OF INVENTION

The present invention relates to an inflation valve.

More particularly, the invention relates to inflation valves for inflating containers with non-rigid-walls, such as dunnage bags.

BACKGROUND TO INVENTION

Inflatable dunnage bags are commonly used for cushioning loads shipped in trucks, trailers and containers transported by ships, trucks or rail. This is often the case when the cargo only partially fills the container and there exists the possibility of shifting during transport that could cause damage. Typically known dunnage bags are constructed of one or more layers of paper surrounding a plastic lining. The paper protects the bags from tearing thus more layers are used in applications where the risk of damage to the dunnage bag is greater. Furthermore, for inflating and deflating the dunnage bag, a valve is attached by way of a hole cut in the bag during manufacture.

The dunnage bags are shipped flat from the manufacturer, and are inflated by packing and loading personnel as the containers are loaded with cargo. The bag is firstly placed in the space that it will occupy as cargo is loaded into a container, secondly the inflation device is attached to a valve of the dunnage bag and subsequently the dunnage bag is filled with air until an appropriate air pressure within the bag is achieved. Often this occurs within a few seconds.

Unfortunately the known type of inflation valves are difficult to operate and not flexible in operation and often do not seal correctly and thus suffer from important limitations.

It is an object of the invention to suggest an inflation device which will assist in overcoming the aforesaid problems.

SUMMARY OF INVENTION

According to the invention, an inflation valve for inflating containers with non-rigid walls, includes (a) a tubular body defining a passage with a first opening at one end leading into the passage and a second opening at its opposite end leading into the passage, the tubular body being adapted to be secured to a container, e.g. with non-rigid walls;

(b) a sealing disc or plunger of plastics material, and being adapted to sealingly close off the second opening to the passage in the tubular body, and being adapted to open the second opening mechanically when an inflation device is inserted into the passage through the first opening and thus gas may be passed into the container through the second opening and thereby moving the sealing disc or plunger away from the second opening;

(c) a guide member located within the passage of the tubular body;

(d) a spring associated with the sealing disc or plunger and supported by the guide member, the spring being adapted to assist the sealing disc or plunger to close off the second opening; and (e) sealing means being adapted to assist the sealing disc or plunger to close of the second opening.

The sealing means may be a gasket and/or a sealing ring located in a cavity or recess in the sealing disc or plunger.

Also according to the invention, there is provided a method of inflating containers with non-rigid walls, which includes the steps:

(a) of passing air and/or gas into a container with non-rigid walls through a tubular body including a passage with a first opening at one end leading into the passage and a second opening at its opposite end leading into the passage, the tubular body being adapted to be secured to the container;

(b) of mechanically opening the second opening by means of a sealing disc or plunger of plastics material when an inflation device is inserted into the passage through the first opening and thus gas is passed into the container through the second opening and thereby moving the sealing disc or plunger away from the second opening; and (c) of sealingly closing off the second opening by means of the sealing disc or plunger of plastics material and a gasket or sealing ring located in a cavity or recess in the sealing disc or plunger, the sealing disc or plunger being operated by means of a spring and supported by a guide member located within the passage of the tubular body, the spring being adapted to assist the sealing disc or plunger to close off the second opening.

The tubular body may include an annular protrusion adapted to abut against the gasket or sealing ring to assist the sealing disc or plunger to close off the second opening.

The spring may have an expanded height of between about 20 to 30 millimeters (mm) and a contracted height of between about 2 to 10 mm.

The tubular body may include at least one supporting member in the passage.

The spring and the guide member and hence also the connected sealing disc or plunger may be locked in position by means of a washer and pin.

The pin 48 may be adapted to expand the guide member of the sealing disc or plunger.

The valve may be a self-closing valve.

The valve may include a cap removably fitted over the tubular body for closing the first opening to the passage.

The method may include the step of fitting a cap over the tubular body for closing the first opening to the passage.

The invention also extends to a container with non-rigid walls provided with an inflation valve as set out herein.

The valve may include deflating means for deflating the container means.

The deflating means may include a tubular part with a cap member.

The deflating means may include at least one aperture in the tubular part and/or the cap member.

The deflating means may be adapted to open the second opening mechanically when the deflating means is inserted into the second opening and thus gas may exit out of the container through the second opening.

The deflating means may include locking means for locking the deflating means to assist in the self-deflating of the container without human assistance.

The deflating means may be connected to the tubular body by means of a connecting strip made of plastics material and a ring member adapted to be removably located around the tubular body.

The valve may include a handle for stabilising the valve whilst the container is being inflated.

The handle may be connected to the tubular body by means of a connecting strip made of plastics material.

The cap and/or the handle and/or the tubular body and/or the deflating means may be integrally formed.

The cap and the handle may be integrally formed and include a ring member adapted to be removably located around the tubular body.

The spring may be conically-shaped.

The spring may be made of metal or plastics material.

The guide member may be made of plastics material.

The sealing disc or plunger and the guide member may be integrally formed.

The valve may be used by venturi air flow guns and devices.

The air entering the container through the inflation valve may have an absolute pressure of about 9 bar.

The tubular body may be provided with a flange for securing the inflation valve to the container.

The container may be a dunnage bag, a sack and/or any other flexible container to be pressurized.

The tubular body and the cap member may include cooperating threads and/or other formations.

The tubular body may be provided with external protrusions and the deflating cap member with associated apertures or recess(es).

The inflation device may include a filling nozzle having cooperating threads, apertures and/or recesses with the tubular body.

The tubular body may be made of plastics and may be injection moulded.

The deflating means may be made of plastics and may be injection moulded.

The sealing disc or plunger and/or the gasket or sealing ring may be made of polyethylene sheet material, resilient plastics or rubber or silicon.

The valve may be a one-way or semi-one way valve.

The valve may be adapted to enable the container to be deflated to create a vacuum in the container.

BRIEF DESCRIPTION OF DRAWINGS

The invention will now be described by way of example with reference to the accompanying schematic drawing.

In the drawings there is shown in:

FIG. 6: a perspective view of the deflating member of the inflation valve according to the invention

DETAILED DESCRIPTION OF DRAWINGS

Figure 1:
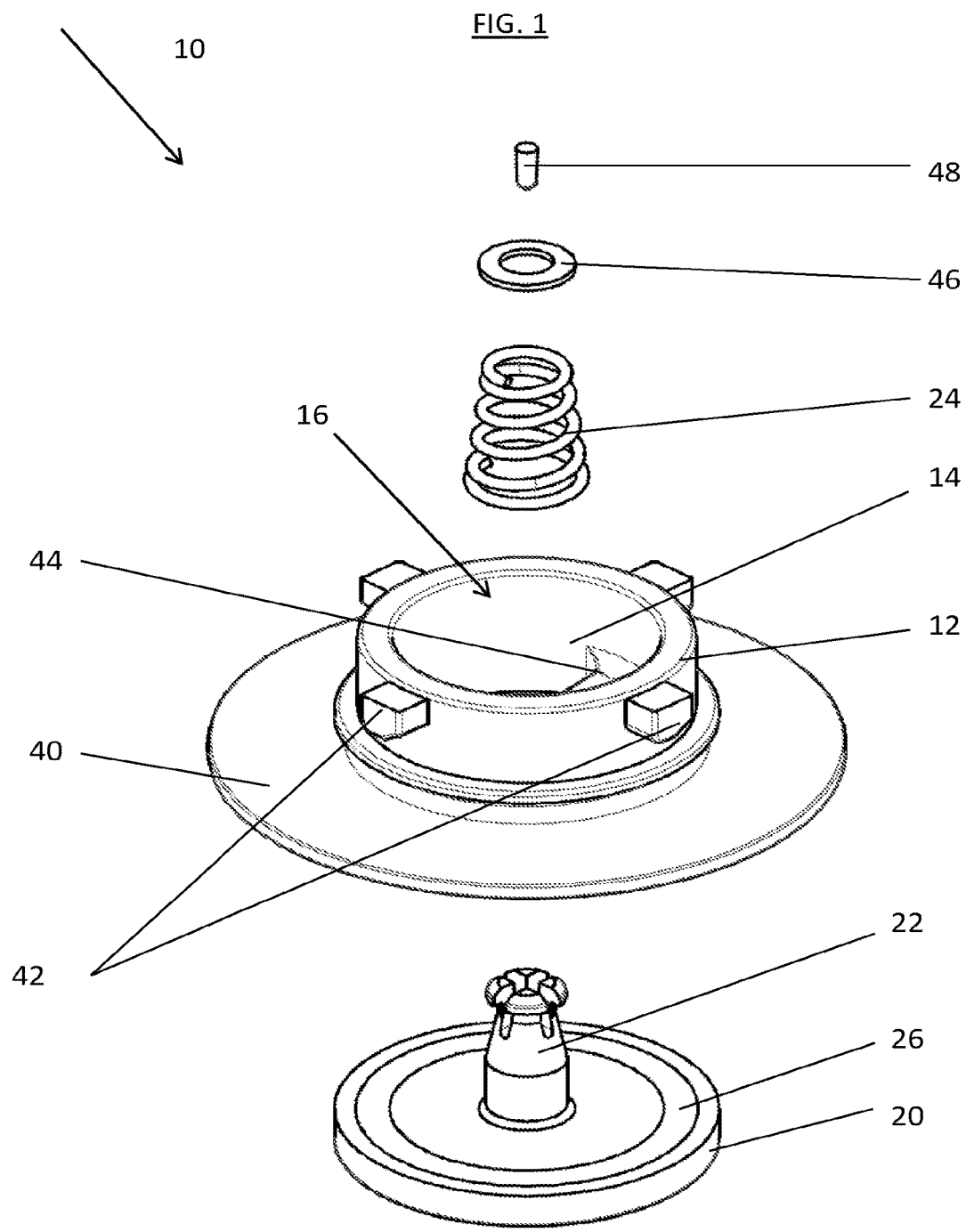
FIG. 1: an exploded perspective view of the inflation valve according to the invention showing the individual components.
Figure 2:
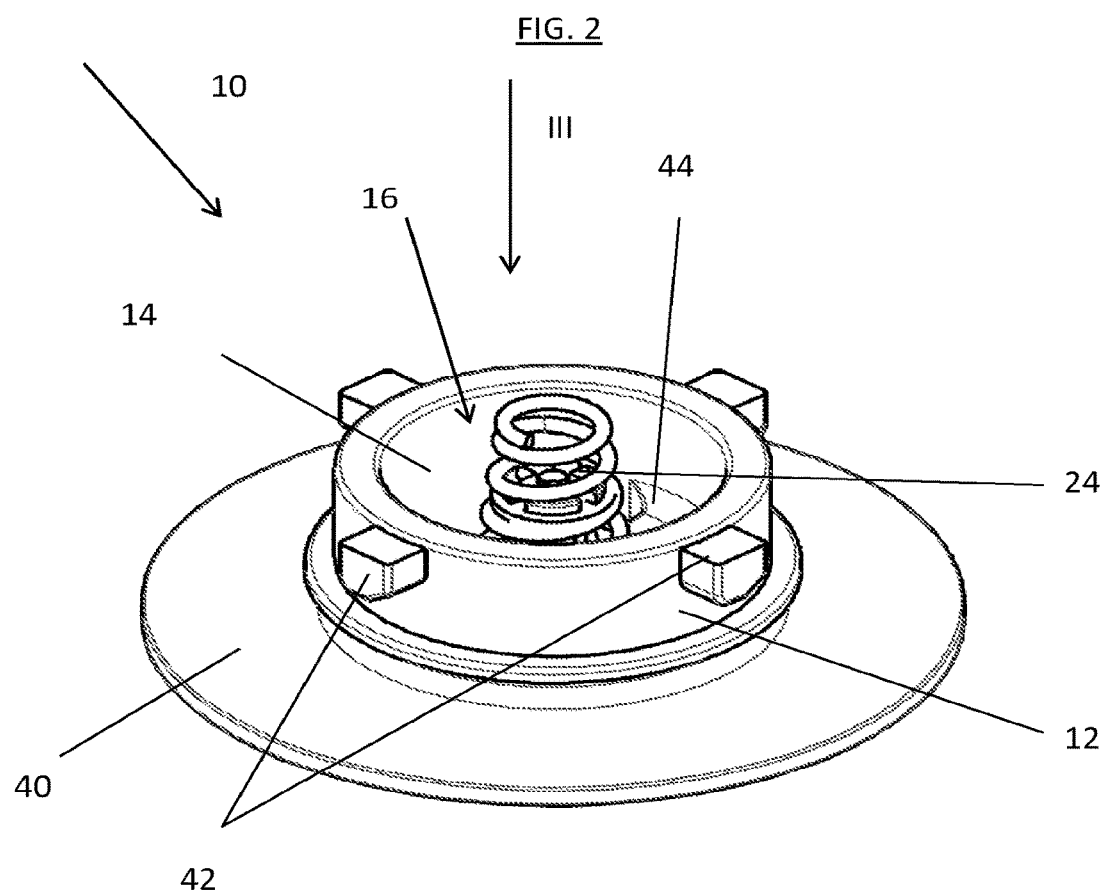
FIG. 2: a perspective view of the assembled inflation valve shown in FIG. 1.
Figure 3:
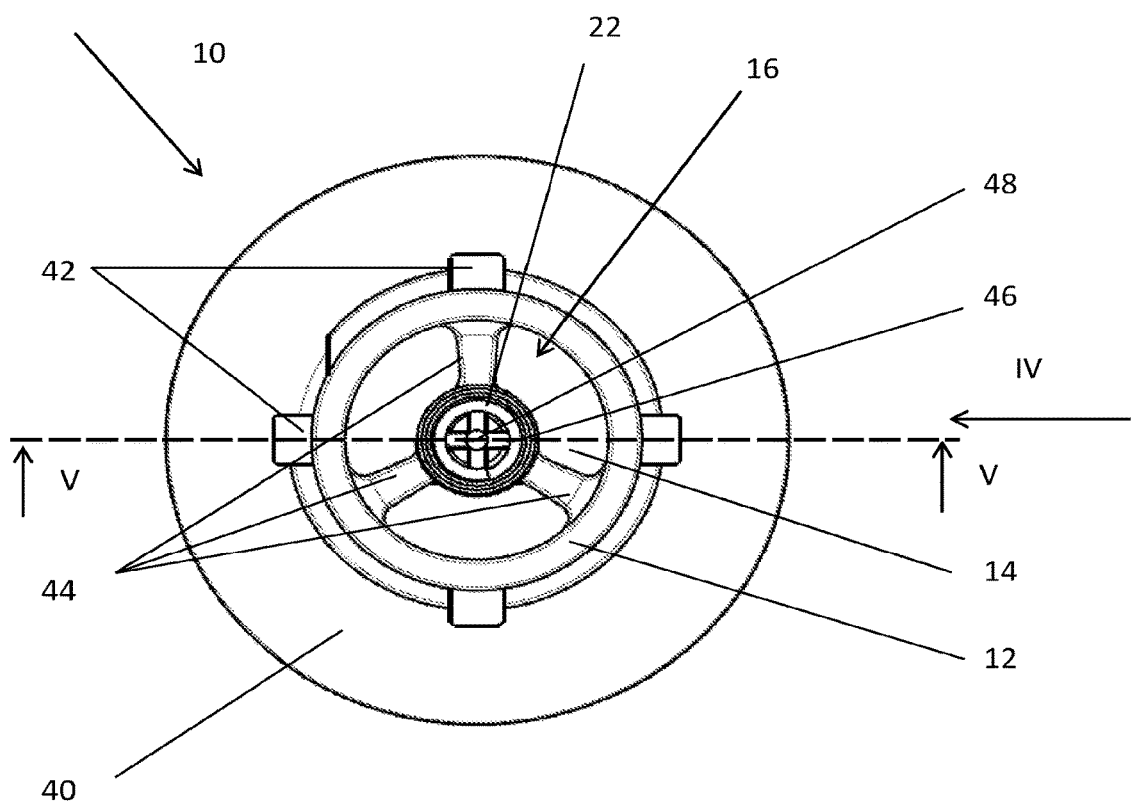
FIG. 3: a top view of the inflation valve as seen from arrow III in FIG. 2.
Figure 4:
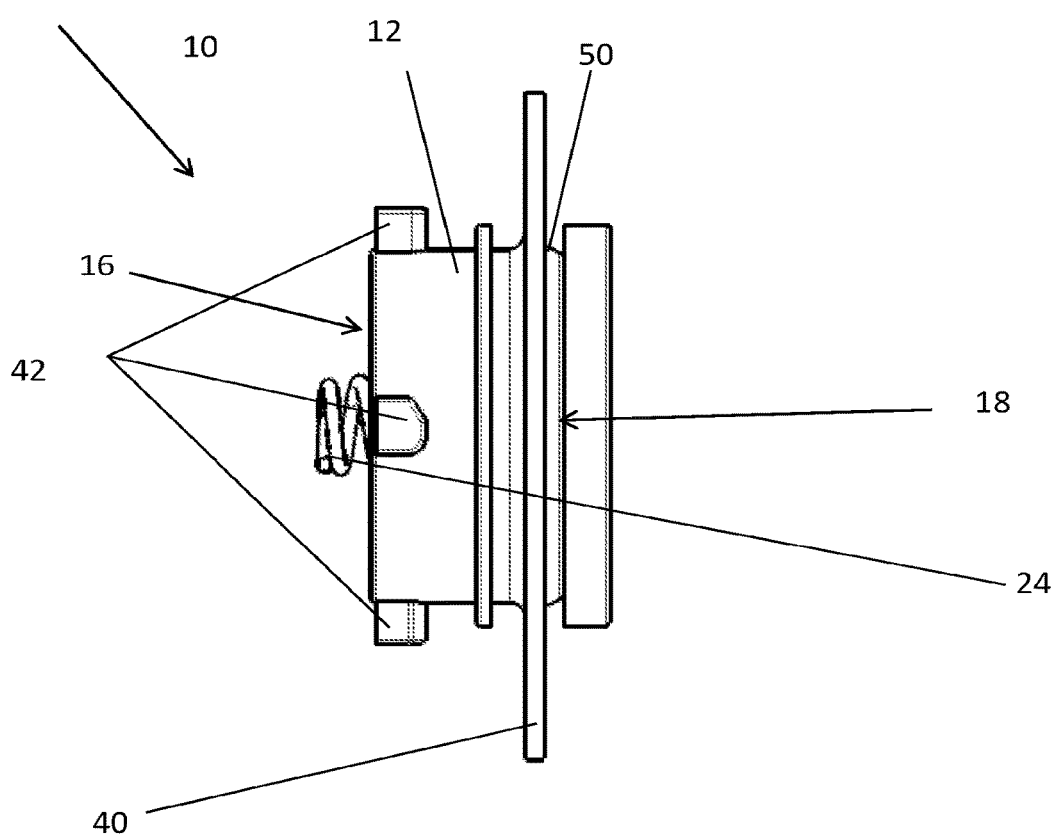
FIG. 4: a side view of the inflation valve as seen from arrow IV in FIG. 3.
Figure 5:
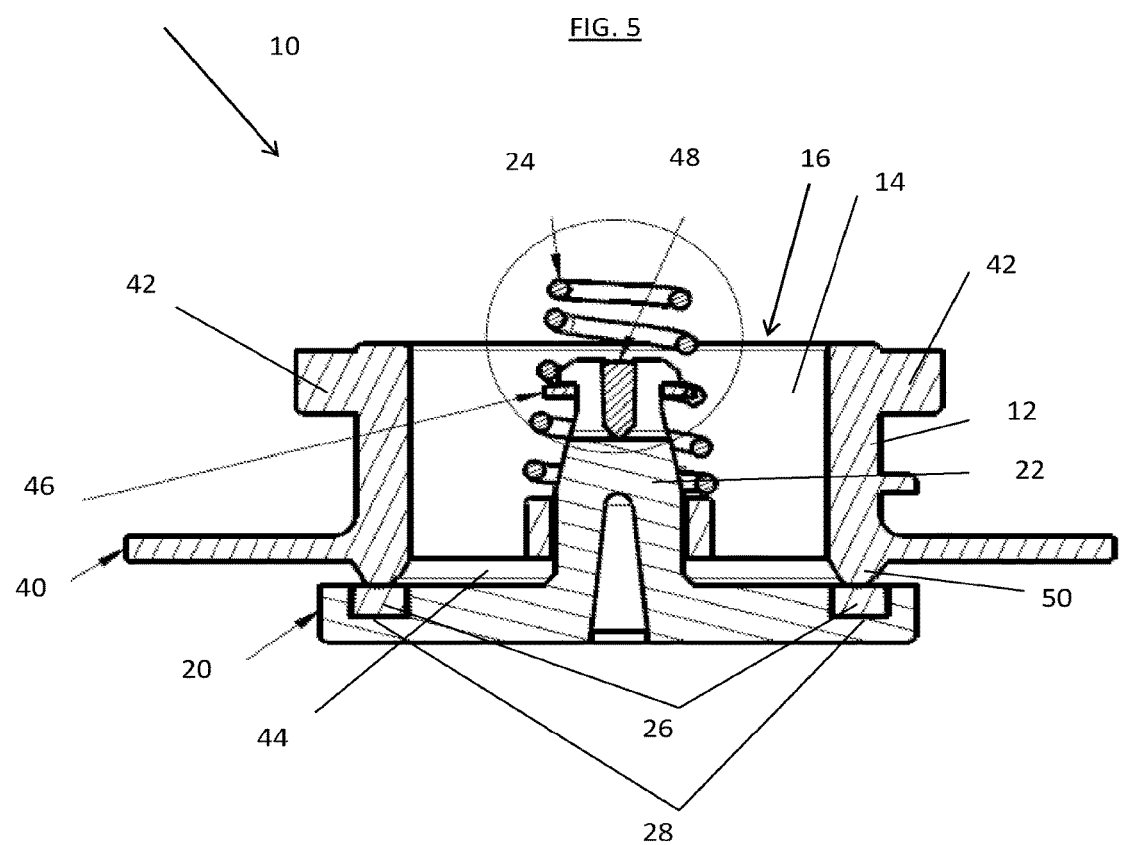
FIG. 5: a sectional side view of the inflation valve as seen along arrows V-V in FIG. 3.

Referring to FIGS. 1 to 6, an inflation valve in accordance with the invention, generally indicated by reference numeral 10, is shown. In FIG. 7, the deflating means 28 of the inflation valve 10 in accordance with the invention is shown.

The inflation valve 10 for inflating containers with non-rigid walls, includes (a) a tubular body 12 defining a passage 14 with a first opening 16 at one end leading into the passage 14 and a second opening 18 at its opposite end leading into the passage 14, the tubular body 12 being adapted to be secured to a container, e.g. with non-rigid walls;

(b) a sealing disc or plunger 20 of plastics material, and being adapted to sealingly close off the second opening 18 to the passage 14 in the tubular body 12, and being adapted to open the second opening 18 mechanically when an inflation device is inserted into the passage 14 through the first opening 16 and thus gas may be passed into the container through the second opening 18 and thereby moving the sealing disc or plunger 20 away from the second opening 18;

(c) a guide member 22 located within the passage 14 of the tubular body 12;

(d) a coil-spring 24 associated with the sealing disc or plunger 20 and supported by the guide member 22, the spring 24 being adapted to assist the sealing disc or plunger 20 to close off the second opening 18; and (e) a gasket or sealing ring 26 located in a cavity or recess 28 in the sealing disc or plunger 24 and being adapted to assist the sealing disc or plunger 20 to close of the second opening 18.

The tubular body 12 includes an annular protrusion 50 adapted to abut against the gasket or sealing ring 26 to assist the sealing disc or plunger 20 to close of the second opening 18.

The spring 24 has an expanded height of between about 20 to 30 millimeters (mm) and a contracted height of between about 2 to 10 mm.

The tubular body 12 includes three supporting members 44 in the passage 14.

The spring 24 and the guide member 22 and hence also the connected sealing disc or plunger 20 are locked in position by means of a washer 46 and pin 48.

The pin 48 is adapted to expand the guide member 22 of the sealing disc or plunger 20.

The valve 10 is a self-closing valve.

The valve 10 can include a cap removably fitted over the tubular body 12 for closing the first opening 16 to the passage 14.

The valve 10 includes deflating means 28 for deflating the container means.

The deflating means 28 includes a tubular part 30 with a cap member 32.

The deflating means 28 includes aperture 34 in the tubular part 30 and the cap member 32.

The deflating means 28 is adapted to open the second opening 18 mechanically when the deflating means 28 is inserted into the second opening 18 and thus gas may exit out of the container through the second opening 18.

The deflating means 28 includes locking means for locking the deflating means 28 to assist in the self-deflating of the container without human assistance.

The deflating means 28 is connected to the tubular body 12 by means of a connecting strip 36 made of plastics material and a ring member 38 adapted to be removably located around the tubular body 12.

The valve 10 includes a handle (not shown) for stabilising the valve 10 whilst the container is being inflated. The handle can be connected to the tubular body 12 by means of the connecting strip 36 made of plastics material. The cap and the handle can integrally formed and include a ring member adapted to be removably located around the tubular body 12.

The cap and/or the handle and/or the tubular body and/or the deflating means 28 can be integrally formed.

The spring 24 is be conically-shaped and is made of metal or plastics material.

The guide member 22 is made of plastics material.

The sealing disc or plunger 20 and the guide member 22 are integrally formed.

The valve 10 is used by venturi air flow guns and devices.

The air entering the container through the inflation valve 10 has an absolute pressure of about 9 bar.

The tubular body 12 is provided with a flange 40 for securing the inflation valve 10 to the container.

The container is a dunnage bag, a sack and/or any other flexible container to be pressurized.

The tubular body 12 and the cap member 32 include cooperating threads and/or other formations.

The tubular body 12 is provided with external protrusions 42 and the deflating cap member 34 with associated apertures or recess(es).

The inflation device 10 includes a filling nozzle having cooperating threads, apertures and/or recesses with the tubular body 12.

The tubular body 12 is made of plastics and may be injection moulded.

The deflating means 28 is made of plastics and may be injection moulded.

The sealing disc or plunger 20 and/or the gasket or sealing ring 26 can be made of polyethylene sheet material, resilient plastics or rubber or silicon.

The valve 10 is a one-way or semi-one way valve.

The valve 10 can be adapted to enable the container to be deflated to create a vacuum in the container.

Hence the invention provides a method of inflating containers with non-rigid walls, which includes the steps:

(a) of passing air and/or gas into a container with non-rigid walls through a tubular body 12 including a passage 14 with a first opening 16 at one end leading into the passage 14 and a second opening 18 at its opposite end leading into the passage 14, the tubular body 12 being adapted to be secured to the container;

(b) of mechanically opening the second opening 18 by means of a sealing disc or plunger 20 of plastics material when an inflation device is inserted into the passage 14 though the first opening 16 and thus gas may be passed into the container through the second opening 18 and thereby moving the sealing disc or plunger 20 away from the second opening 18; and (c) of sealingly closing off the second opening 18 by means of the sealing disc or plunger 20 of plastics material and a gasket or sealing ring 26 located in a cavity or recess 28 in the sealing disc or plunger 20, the sealing disc or plunger 20 being operated by means of a spring 24 and supported by a guide member 22 located within the passage 14 of the tubular body 12, the spring 24 being adapted to assist the sealing disc or plunger 20 to close off the second opening 18.

The method may include the step of fitting a cap over the tubular body 12 for closing the first opening 16 to the passage 14.

The method includes the step of deflating the container after the fitting step by a means of deflating the container associated with a valve 10.

In use the inflation valve 10 is secured to a container, such as a dunnage bag, a sack or other containers with non-rigid walls.

When filling the container, a gas filling nozzle of an inflation device is connected by means of an adapter to the inflation valve 10. The gas passed into the container pushes the sealing disc or plunger 20 away from the tubular body 12 and thus the gas can enter the container through the second opening 18. Thereby, the inflation valve 10 is opened and allows inflation of the container. When removing the gas filling nozzle, the sealing disc or plunger 22 together with the gasket or sealing ring 26 moves to its original position as a result of the action of the spring 26 and sealingly fits over the second opening 18. The pressure of gas inside the container facilitates the sealing of the second opening 18 by means of the sealing disc or plunger 22.

Furthermore, in order to ensure that the gas filling nozzle is locked once inserted in the first opening 16, the gas filling nozzle is provided with an internal thread or formation which cooperates with an external thread or protrusion of the tubular body 12.

What I claim is:

1. A valve comprising
   a body defining a first opening, a second opening, and a passage between the first and second openings;
   a sealing disc;
   a guide member attached to the sealing disc and at least partially positioned within the passage, the guide member and the sealing disc being movable relative to the body between a closed position in which the second opening is closed and an open position in which the second opening is open;
   a biasing element supported by the body and biasing the guide member and the sealing disc to the closed position; and
   a pin received in the guide member to expand the guide member and retain the biasing element in position.

2. The valve of claim 1, wherein the sealing disc sealingly engages the body when the guide member and the sealing disc are in the closed position, and the sealing disc is spaced apart from the body when the guide member and the sealing disc are in the open position.

3. The valve of claim 2, wherein the sealing disc comprises a deformable sealing ring, and wherein the sealing ring sealingly engages the body when the guide member and the sealing disc are in the closed position.

4. The valve of claim 3, wherein the sealing disc defines a cavity sized to receive the sealing ring.

5. The valve of claim 3, wherein the body comprises an annular protrusion, and wherein the sealing ring sealingly engages the annular protrusion when the guide member and the sealing disc are in the closed position.

6. The valve of claim 1, wherein the guide member comprises a lip.

7. The valve of claim 6, wherein the pin is received in the guide member to expand the guide member and retain the biasing element in position between the lip and the body.

8. The valve of claim 7, further comprising a washer surrounding the guide member and positioned between the lip of the guide member and the biasing element.

9. The valve of claim 7, wherein the body comprises a supporting member that extends radially inwardly into the passage and supports the biasing element.

10. The valve of claim 1, wherein the sealing disc and the guide member are integrally formed.

11. An inflatable container comprising:
    multiple non-rigid walls defining an interior, and a valve comprising
- a body defining a first opening, a second opening, and a passage between the first and second openings;
- a sealing disc;
- a guide member attached to the sealing disc and at least partially positioned within the passage, the guide member and the sealing disc being movable relative to the body between a closed position in which the second opening is closed and the passage is not in fluid communication with the interior and an open position in which the second opening is open and the passage is in fluid communication with the interior,
- a biasing element supported by the body and biasing the guide member and the sealing disc to the closed position; and
- a pin received in the guide member to expand the guide member and retain the biasing element in position.

12. The inflatable container of claim 11, wherein the sealing disc sealingly engages the body when the guide member and the sealing disc are in the closed position, and the sealing disc is spaced apart from the body when the guide member and the sealing disc are in the open position.

13. The inflatable container of claim 12, wherein the sealing disc comprises a deformable sealing ring, and wherein the sealing ring sealingly engages the body when the guide member and the sealing disc are in the closed position.

14. The inflatable container of claim 13, wherein the sealing disc defines a cavity sized to receive the sealing ring.

15. The inflatable container of claim 13, wherein the body comprises an annular protrusion, and wherein the sealing ring sealingly engages the annular protrusion when the guide member and the sealing disc are in the closed position.

16. The inflatable container of claim 11, wherein the guide member comprises a lip.

17. The inflatable container of claim 16, wherein the pin is received in the guide member to expand the guide member and retain the biasing element in position between the lip and the body.

18. The inflatable container of claim 17, wherein the valve further comprises a washer surrounding the guide member and positioned between the lip of the guide member and the biasing element.

19. The inflatable container of claim 17, wherein the body comprises a supporting member that extends radially inwardly into the passage and supports the biasing element.

20. The inflatable container of claim 11, wherein the sealing disc and the guide member are integrally formed.

* * * * *